United States Patent
Feldtkeller

(10) Patent No.: US 6,753,798 B2
(45) Date of Patent: Jun. 22, 2004

(54) FILTER CONFIGURATION, METHOD FOR FILTERING AN ANALOG FILTER INPUT SIGNAL, AND POWER FACTOR CONTROLLER

(75) Inventor: Martin Feldtkeller, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/377,813

(22) Filed: Feb. 28, 2003

(65) Prior Publication Data

US 2003/0172103 A1 Sep. 11, 2003

Related U.S. Application Data

(63) Continuation of application No. PCT/EP01/08719, filed on Jul. 27, 2001.

(30) Foreign Application Priority Data

Aug. 30, 2000 (DE) .......................................... 100 42 587

(51) Int. Cl.[7] ............................................... H03M 3/00
(52) U.S. Cl. ........................ 341/143; 341/155; 341/144
(58) Field of Search ................................ 341/143, 144, 341/118, 155, 120; 324/76.11, 76.16

(56) References Cited

U.S. PATENT DOCUMENTS

| | | | | |
|---|---|---|---|---|
| 4,450,074 | A | | 5/1984 | Ochiai ........................ 323/207 |
| 4,864,253 | A | * | 9/1989 | Zwack ........................ 331/1 A |
| 4,939,739 | A | * | 7/1990 | Hobart et al. ................ 372/107 |
| 5,359,276 | A | | 10/1994 | Mammano ................. 210/96.1 |
| 5,615,234 | A | * | 3/1997 | Brooks ........................ 375/350 |
| 5,801,935 | A | | 9/1998 | Sugden et al. ................ 363/89 |
| 6,278,255 | B1 | * | 8/2001 | Yoo et al. ................... 318/798 |

FOREIGN PATENT DOCUMENTS

| | | | |
|---|---|---|---|
| DE | 4339304 A1 | 5/1995 | .......... H03K/21/02 |
| EP | 0 805 548 A2 | 11/1997 | .......... H05B/41/28 |
| WO | WO 00/07414 | 2/2000 | ............ H02M/1/12 |

OTHER PUBLICATIONS

Hyun Chil Choi et al.: "A Soft–Switched, High–Frequency Resonant Rectifier and Characteristics of the Controlled System", IEEE Transactions on Power Electronics, vol. 12, No. 1, Jan. 1997, pp. 161–172.
Tietze/Schenk: "Semiconductor circuitry", *Springer Verlag*, 9th ed., 1991, pp. 436–455.
De Mari Yves: "Easy Power Factor Corrector Using A DSP", *Power Conversion, Jun. 1999 Proceedings*, pp. 585–592.
Bernhard E. Boser et al.: "Design of a CMOS Second Order Sigma–Delta Modulator", *1988 IEEE International Solid–State Circuits Conference*, pp. 258–259.

* cited by examiner

*Primary Examiner*—Peguy JeanPierre
(74) *Attorney, Agent, or Firm*—Laurence A. Greenberg; Werner H. Stemer; Ralph E. Locher

(57) ABSTRACT

A filter system and a method for filtering an analog signal includes an analog-to-digital converter with an input to which an analog filter input signal is supplied, and an output at which an impulse signal is available that includes a sequence of impulses, the number of the impulses per time unit depending on the magnitude of the filter input signal. The filter system is further provided with a counter system to which the impulse signal is supplied and that contains at least one counter. At least once during an interval of evaluation, a counter reading of the at least one counter is supplied to a digital-to-analog converter to produce an analog filter output signal, the amplitude of the filter output signal depending on the value of the counter reading. The filter system can be placed in a power factor controller.

38 Claims, 9 Drawing Sheets

FILTER CONFIGURATION, METHOD FOR FILTERING AN ANALOG FILTER INPUT SIGNAL, AND POWER FACTOR CONTROLLER

CROSS-REFERENCE TO RELATED APPLICATION

This application is a continuation of copending International Application No. PCT/EP01/08719, filed Jul. 27, 2001, which designated the United States and was not published in English.

BACKGROUND OF THE INVENTION

Field of the Invention

The present invention relates to a filter configuration, in particular, to a filter configuration that is suitable for filtering an output voltage signal of a power factor controller, a method for filtering an analog filter input signal, and a power factor controller.

FIG. 1 shows an exemplary embodiment of a power factor controller according to the prior art. Such a power factor controller has the task of forming a uniform output voltage Uout from an alternating input voltage Uin, in which case the intention is for the output voltage Uout to be kept at least approximately constant both in the event of changes in a load that can be connected to output terminals AK1, AK2 and for AC voltages having different peak values or root-mean-square values. To convert the input voltage Uin into the output voltage Uout, use is made of a step-up switching regulator (boost converter) that is connected downstream of a bridge rectifier and has a series circuit including an inductor L and a switch T in parallel with the bridge rectifier BR and a series circuit including a diode D and a capacitor C in parallel with the switch, it being possible to tap off the output voltage Uout at the capacitor C. With switch T closed, the inductor takes up energy and outputs it through the diode D to the capacitor when switch T has, subsequently, been opened.

The switch T, which is a power transistor, in particular, is driven in clocked fashion by a pulse width modulator PWM, the output voltage Uout or the power consumption of the power factor controller being dependent on the frequency with which the switch is closed and on the switch-on duration for which the switch remains closed.

The power factor controller has both a current regulating circuit for regulating the current consumption from the mains and a voltage regulating circuit for regulating the output voltage Uout. The task of the current regulating circuit is to regulate the current $I_L$ through the coil such that the average value of the coil current is proportional to the input voltage Uin, or the magnitude of the input voltage Uin, for the comparison of an instantaneous value of the input voltage Uin and of the coil current $I_L$, the pulse width modulator PWM is fed, from a measuring configuration MA1 through a multiplier, an input voltage signal that is dependent on the input voltage Uin, and a voltage Ui that is present across a current sensing resistor Rs, as current signal.

The task of the voltage regulating circuit is to keep the output voltage Uout constant in the event of fluctuations in a load connected to the output terminals AK1, AK2 or in the event of a variable input voltage Uin. To that end, a second voltage signal, which is dependent on the output voltage and is formed by a second measuring configuration MA2, is compared with a reference value Vref. The information regarding the deviation of the second voltage signal Vs2 from the reference value is fed to the pulse width modulator PWM by multiplication of the differential signal by the first voltage signal Vs1. The amplitude of the voltage signal Vs fed to the pulse width modulator PWM is, thus, raised or lowered depending on the output voltage Uout.

The signal Vs1 fed to the multiplier MUL for multiplication by the first voltage signal, preferably, changes very slowly in comparison with the period duration of the input voltage. To prevent hum signals that are superposed on the output voltage signal Vs2 from distorting the sinusoidal waveform of the voltage signal Vs, and from thus disturbing the regulation of the output voltage, a low-pass filter is provided in the voltage regulating loop. The low-pass filter is formed by two capacitors Cf1, Cf2 and a resistor, which are connected up to an operational amplifier OP1 that forms the difference between the reference signal Vref and the second voltage signal.

The capacitors and the resistor have to be embodied as external components, that is to say, they cannot be integrated in an integrated circuit, which is how the pulse width modulator PWM is usually embodied. This need for external components increases the costs of the drive circuit of the switch.

The paper: "Easy Power Factor Corrector Using a DSP" by Yves De Mari et al., Power Conversion, June 1999 Proceedings, pages 585 to 592, discloses using a digital signal processor (DSP) for filtering a signal dependent on the output voltage in a power factor controller. Such a procedure is expedient if a DSP is present, there is still free computational capacity in the DSP, and there is no need for mains isolation between the DSP and a power section of the power factor controller. Otherwise, the use of a DSP that is used only for filtering the voltage signal is too cost-intensive for most applications.

SUMMARY OF THE INVENTION

It is accordingly an object of the invention to provide a filter configuration, a method for filtering an analog filter input signal, and a power factor controller that overcome the hereinafore-mentioned disadvantages of the heretofore-known devices and methods of this general type and that can be realized cost-effectively and without external components and that can be accommodated, in particular, as a constituent part of an integrated circuit in a drive circuit of a power transistor.

With the foregoing and other objects in view, there is provided, in accordance with the invention, a filter configuration for filtering an analog signal, including an analog-to-digital converter unit having an input for receiving an analog filter input signal having a magnitude and an output supplying a pulse signal having a sequence of pulses, a number of the pulses per unit time being dependent on the magnitude of the filter input signal, a counter configuration being connected to the output of the analog-to-digital converter unit and receiving the pulse signal from the analog-to-digital converter unit, the counter configuration having at least one counter supplying a counter reading having a value, and a digital-to-analog converter unit connected to the counter configuration, the counter configuration supplying to the digital-to-analog converter unit in each case once during an evaluation interval the counter reading and forming an analog filter output signal having an amplitude dependent upon the value of the counter reading.

Accordingly, the filter configuration has an analog-to-digital converter unit having an input, to which an analog filter input signal is fed, and having an output, at which a pulse signal is available. In such a case, the pulse signal has a sequence of pulses, the analog-to-digital converter unit being configured such that the number of pulses of the pulse signal per unit time is dependent on the magnitude of the filter input signal. Connected downstream of the analog-to-digital converter unit is a counter configuration, to which the pulse signal is fed and that has at least one counter whose counter reading changes depending on the pulses of the pulse signal. The counter is configured such that, in each case at the end of a periodically recurring sampling interval, the counter reading of the at least one counter is acquired and is available as counter output signal. Connected downstream of the counter configuration is a digital-to-analog converter unit, to which the counter output signal is fed and that provides an analog filter output signal dependent on the value of the counter reading.

Such a filter according to the present invention can be used as a filter in a feedback path of a power factor controller, but it can also be used for filtering arbitrary output signals with long time constants from sensors. In particular, the power factor controller can include input terminals for applying an input voltage, output terminals for providing an output voltage, an inductor having an energy uptake, the inductor connected to at least one of the input terminals, at least one switch connected to the inductor and controlling the energy uptake of the inductor, a drive circuit connected to the switch and driving the switch, a feedback path connected to the output terminals and to the drive circuit and feeding a signal dependent upon the output voltage back to the drive circuit, the signal having a magnitude, the feedback path having the filter configuration according to the present invention.

In accordance with another feature of the invention, at least one counter of the counter configuration is, preferably, configured such that it effects exclusively up-counting or exclusively down-counting. Furthermore, the pulse signal and the duration of the evaluation interval are coordinated with one another such that the counter overflows at least once within an evaluation interval and starts to count anew at an initial value.

In accordance with a further feature of the invention, the at least one counter starts to count at an initial value and has a minimum or maximum counter reading and, upon reaching the minimum or maximum counter reading, the at least one counter starts to count at the initial value again.

Such a digital filter having only an up-counter has an integrating action on the filter input signal, the counter readings remaining the same at the end of the evaluation intervals if a filter input signal is established in the case of which the pulse signal formed by the AD converter unit outputs, within the evaluation interval, a number of pulses corresponding to the maximum counter reading of the counter so that the counter overflows once and, at the end of the evaluation interval, again assumes the counter reading at the end of the previous evaluation interval.

Such a filter can be used as an integrating regulator (I regulator) in the voltage regulating circuit of a power factor controller, in which case the AD converter unit, the counter configuration and the DA converter unit can be realized in an integrated circuit without external components. At the gate level, such a filter can be realized with fewer than 100 gates that can be accommodated in the drive chip of a power transistor.

In accordance with an additional feature of the invention, the AD converter unit may be configured as a conventional voltage-controlled oscillator, as is described, for example, in Tietze, Schenk: "Halbleiterschaltungs-technik" ["Semiconductor circuitry"], 9th edition, Springer, 1991, page 488 et seq. [page 436 et seq.]. Furthermore, the AD converter unit used may also be a so-called sigma-delta converter, which is described for example in the paper "Design of a CMOS Second-Order Sigma-Delta Modulator" by Bernhard E. Boser et al., 1988 IEEE Solid State Conference, Digest of Technical Papers, pages 258 to 259.

In accordance with an added feature of the invention, the analog-to-digital converter unit has a signal generator configuration for providing a reference signal rising continuously in sections and a clock generator, the analog-to-digital converter unit compares the reference signal and the analog filter input signal, and the analog-to-digital converter unit supplies the pulse signal as a clock signal at the output dependent upon the comparison of the reference signal and the analog filter input signal.

A conventional digital-to-analog converter may be used as the DA converter unit, in which case, for the use in a power factor controller, a multiplying DA converter is, preferably, used that, in addition to the counter output signal, is fed a further signal, for example, the input voltage signal of the power factor controller. A signal corresponding to the product of the further signal with an analog signal dependent on the counter output signal is present at the output of the multiplying DA converter.

In the filter according to the invention, the filter output signal may have a proportional and an integrating component if the counter configuration has a first counter and a second counter, the counter reading of the second counter, at the beginning of an evaluation interval, being set to the value of the counter reading of the first counter at the end of the previous evaluation interval. The counter reading of the second counter at the end of the evaluation interval is fed to the DA converter unit for the purpose of forming the filter output signal. The counter reading of the first counter at the end of the evaluation interval corresponds to the integrating component of the filter output signal. The difference between the counter reading of the second counter at the end of the evaluation interval and the counter reading at the beginning of the evaluation interval corresponds to the proportional component of the filter output signal.

A filter output signal having an integrating and a proportional component can also be generated by a counter that is set to a stored counter reading at the beginning of an evaluation interval, the stored value corresponding to a counter reading of the counter after a first time interval within the evaluation interval. The counter reading at the end of a second time interval subsequent to the first time interval is used for the formation of the filter output signal by the DA converter.

This counter is incremented at the beginning of the evaluation interval, preferably, during a predetermined time interval according to a clock signal proceeding from the value stored in the register, until it is, subsequently, incremented further during the first and second time intervals according to the pulse signal.

The counter reading determined at the end of the first time interval, which counter reading is stored in the register, forms the integrating component of the filter output signal. The integrating and proportional components of the filter output signal are formed successively in the case of this embodiment of the invention.

In all of the embodiments of the filter according to the invention, the analog-to-digital conversion of the filter input signal is equivalent to a sampling of the filter input signal and effects a filtering out of hum components in the filter input signal.

In accordance with yet another feature of the invention, the digital-to-analog converter unit has an output terminal providing the analog filter output signal, a first series circuit having k resistors and k+1 voltage taps, a voltage dependent on the further signal being present across the first series circuit, at least one second series circuit having first and second connection terminals, m resistors, and m voltage taps, a first switch having a first and second contact pair connecting the first and second connection terminals to two different voltage taps of the k+1 voltage taps of the first series circuit, the first switch being driven dependent upon the output signal of the counter configuration, and a second switch selectively connecting one of the m voltage taps of the second series circuit to the output terminal and provide the analog filter output signal, the second switch being driven dependent upon the output signal of the counter configuration.

In accordance with yet a further feature of the invention, the digital-to-analog converter unit has an output terminal providing the analog filter output signal, a first series circuit having k resistors and k+1 voltage taps, a voltage dependent on the further signal being present across the first series circuit, at least one second series circuit having first and second connection terminals, m resistors, and m voltage taps, a first switch having a first and second contact pair connecting the first and second connection terminals to two different voltage taps of the k+1 voltage taps of the first series circuit, the first switch being driven dependent upon the counter reading of the counter configuration, and a second switch selectively connecting one of the m voltage taps of the second series circuit to the output terminal and provide the analog filter output signal, the second switch being driven dependent upon the counter reading of the counter configuration.

In accordance with yet an added feature of the invention, the resistors of at least one of the first series circuit and the second series circuit are different in each case.

In accordance with yet an additional feature of the invention, the analog-to-digital converter unit has a first and second voltage-controlled oscillator each supplying an output signal or a first and second sigma-delta converter each supplying an output signal, the counter configuration has first and second counters, the output signal of the first voltage-controlled oscillator or the first sigma-delta converter is fed to the first counter, an output signal of the second voltage-controlled oscillator or the second sigma-delta converter is fed to the second counter, and the first and second counters are coupled to set the second counter to a counter reading of the first counter.

With the objects of the invention in view, there is also provided a method for filtering an analog signal. The method provides for a filter input signal to be converted into at least one first pulse signal having a sequence of pulses, the number of pulses per unit time being dependent on the amplitude of the regulating signal. Furthermore, in the method, the counter reading of at least one counter is changed according to pulses of the pulse signal, the at least one counter, preferably, effecting exclusively up-counting or down-counting. The counter reading of the at least one counter is determined in predeterminable evaluation intervals, an analog filter output signal dependent on the counter reading determined subsequently being formed, the amplitude of which filter output signal is dependent on the counter reading.

In accordance with again another mode of the invention, there is provided the step of exclusively effecting up-counting or down-counting with the at least one counter. Upon reaching a minimum or maximum counter reading, the at least one counter starts to count at an initial value again.

In accordance with again a further mode of the invention, there is provided the step of increasing the counter reading with each pulse of the pulse signal.

In accordance with again an added mode of the invention, there are provided the steps of changing the counter reading of the at least one counter dependent upon pulses of a clock signal within a first time interval at a beginning of an evaluation interval and subsequently changing the counter reading dependent upon pulses of the pulse signal within a second and third time interval, storing the counter reading at the end of the second time interval, and setting the counter to the stored counter reading at the beginning of the next evaluation interval.

In accordance with again an additional mode of the invention, there is provided the step of setting the third time interval to be longer than the second time interval.

In accordance with still another mode of the invention, there is provided the step of increasing the counter reading by a fixed value within the first time interval.

In accordance with still a further mode of the invention, there are provided the steps of defining a first lower value and a first upper value, and storing the first lower value or the first upper value at an end of the second time interval if the counter reading lies outside an interval defined by the first lower value and the first upper value.

In accordance with still an added mode of the invention, there are provided the steps of defining a lower limit value and an upper limit value and outputting the counter reading of the at least one counter to form a control signal if the counter reading lies within an interval defined by the lower limit value and the upper limit value.

In accordance with still an additional mode of the invention, there are provided the steps of converting the analog filter input signal into a first pulse signal and a second pulse signal each having pulses, providing the at least one counter as a first counter and a second counter, changing a counter reading of the first counter dependent upon the pulses of the first pulse signal and changing a counter reading of the second counter dependent upon the pulses of the second pulse signal, setting the second counter, at the beginning of an evaluation interval, to the counter reading of the first counter at an end of a previous evaluation interval, and forming the filter output signal utilizing the counter reading of the second counter at an end of an evaluation interval.

In accordance with another mode of the invention, there is provided the step of setting frequencies of the first and second pulse signals to differ for the same filter input signal.

In accordance with a further mode of the invention, there are provided the steps of converting the analog filter input signal into the first pulse signal and a second pulse signal each having frequencies and setting the frequencies of the first and second pulse signals to differ for the same filter input signal.

In accordance with an added mode of the invention, during generation of the filter output signal, there is provided the step of, multiplying the counter reading by an instantaneous value of a further signal.

In accordance with an additional mode of the invention, there is provided the step of multiplying the further signal by a predeterminable factor prior to the multiplication, the factor being dependent upon an average value of the further signal.

In accordance with yet another feature of the invention, there is provided the step of setting the amplitude of the filter output signal to be exponentially dependent on the counter reading at an end of an evaluation interval.

In accordance with a concomitant mode of the invention, there is provided the step of setting the amplitude of the filter output signal to not be linearly dependent upon the counter reading at an end of an evaluation interval.

Other features that are considered as characteristic for the invention are set forth in the appended claims.

Although the invention is illustrated and described herein as embodied in a filter configuration, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

In the figures, unless specified otherwise, identical reference symbols designate identical parts with the same meaning.

Figure 1:
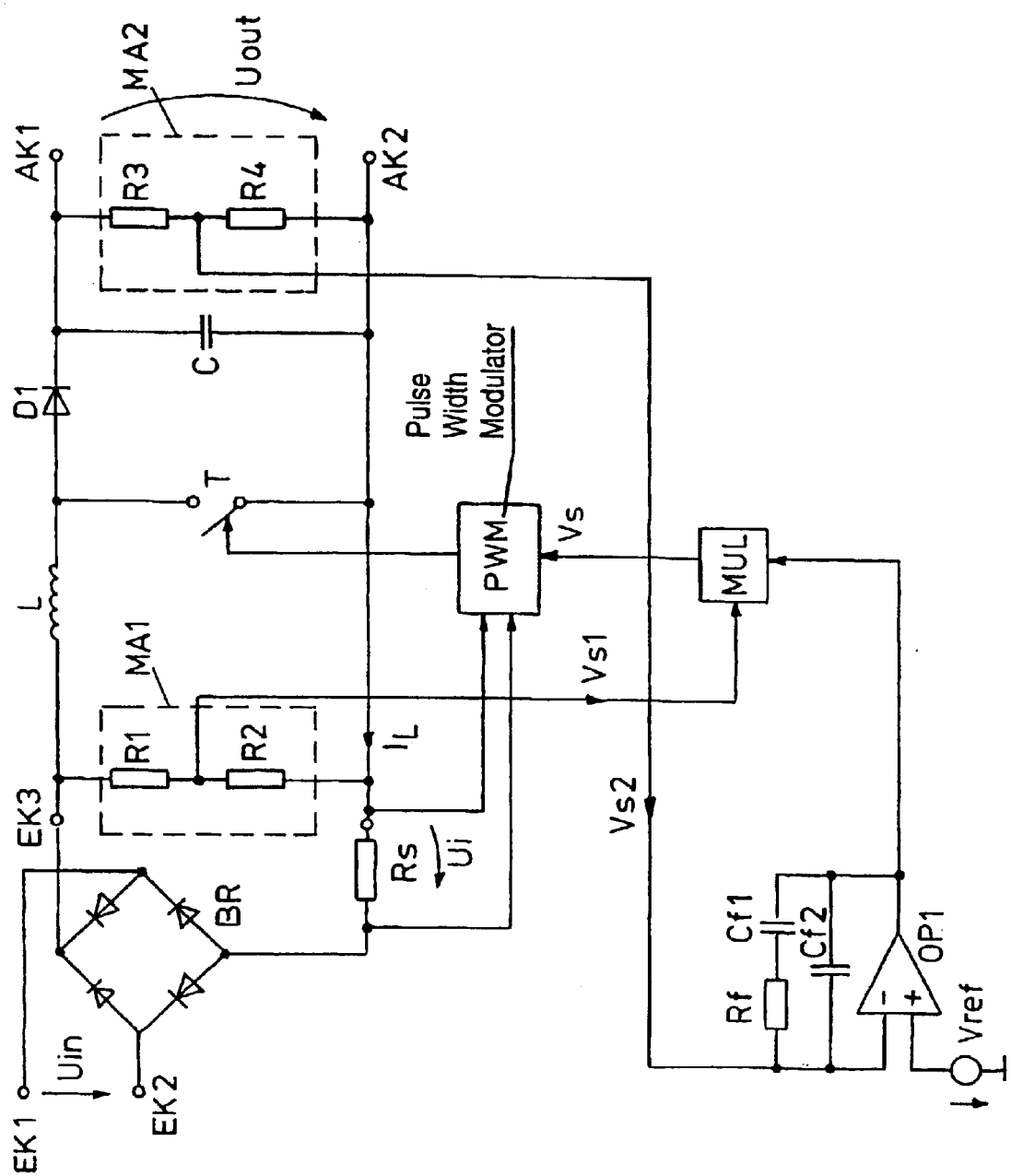
FIG. 1 is a block and schematic circuit diagram of a prior art power factor controller.
Figure 2:
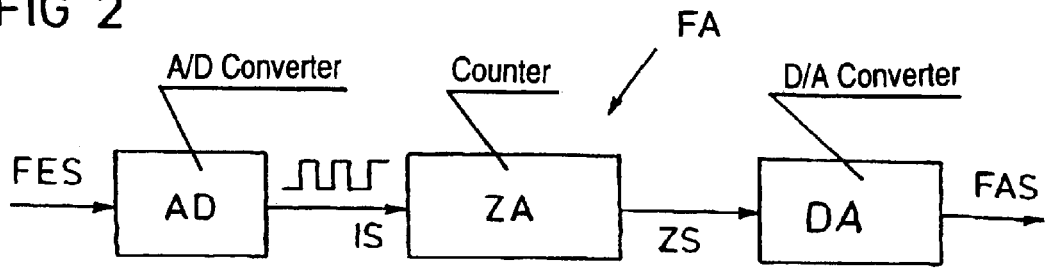
FIG. 2 is a block diagram of a filter configuration according to the invention with an AD converter unit, a counter configuration, and a DA converter unit.

Referring now to the figures of the drawings in detail and first, particularly to FIG. 2 thereof, there is shown a first exemplary embodiment of a filter configuration according to the invention, having an analog-to-digital converter unit (AD converter unit) AD, to which a filter input signal FES is fed. Connected downstream of the AD converter unit AD is a counter configuration ZA, to which is fed a pulse signal IS present at the output of the AD converter unit AD. A counter signal ZS present at the output of the counter configuration ZA is fed to a digital-to-analog converter unit (DA converter unit) DA, at whose output a filter output signal FAS is available.

The AD converter unit is configured such that it converts an analog filter input signal FES into a pulse signal IS, the number of pulses of the pulse signal IS per unit time being dependent on the magnitude of the filter input signal FES. Such an AD converter unit AD is, by way of example, a conventional voltage-controlled oscillator VCO that provides an output signal whose frequency is dependent on the instantaneous value of an input signal. Furthermore, a sigma-delta converter can be used as the AD converter unit and, likewise, provides a clocked output signal, a number of positive pulses of the output signal per unit time, likewise, being dependent on the magnitude of an input signal.

Figure 3:
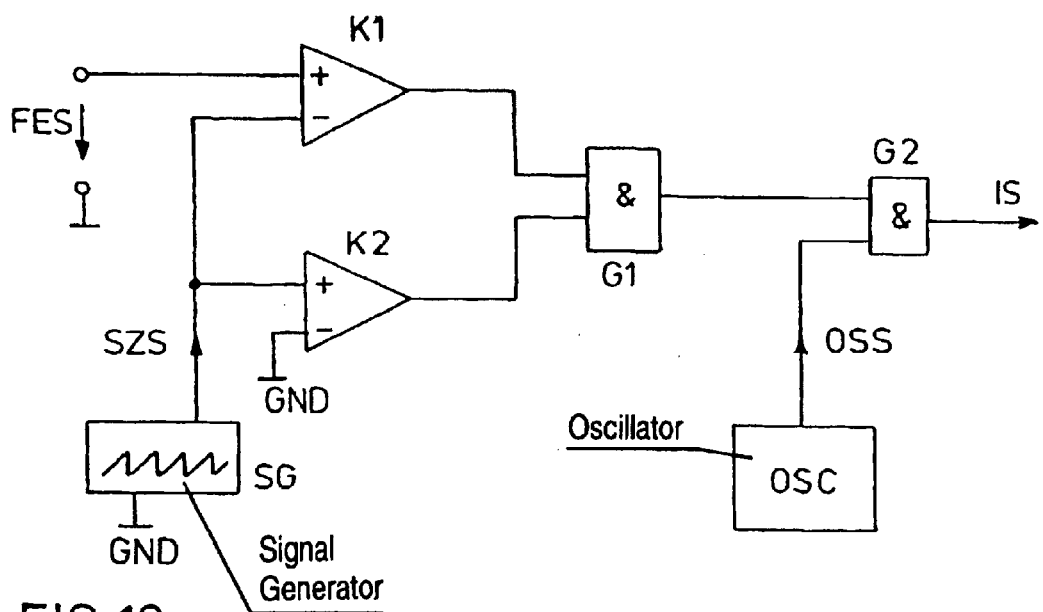
FIG. 3 is a schematic and block circuit diagram of an embodiment of an AD converter unit according to the invention.

FIG. 3 shows a further exemplary embodiment of an AD converter unit that can be used for the filter configuration according to the invention. The circuit configuration has a first comparator K1 and a second comparator K2, the filter input signal FES being fed to a noninverting input of the first comparator K1, and a sawtooth signal SZS being fed to the inverting input of the first comparator K1 and to the noninverting input of the second comparator K2. The inverting input of the second comparator K2 is connected to reference-ground potential GND. The periodic sawtooth signal SZS is available at the output of a signal generator configuration SG. The outputs of the first and second comparators K1, K2 are connected to inputs of an AND element. A high level is present at the output of the AND element G1 as long as the rising edge of the sawtooth signal SZS is in an interval between the value of the reference-ground potential GND and the value of the filter input signal FES. If the sawtooth signal SZS exceeds the value of the filter input signal FES, the output signal changes to a low level. An output signal of the AND element G1 is fed to a second AND element G2, at whose other input an oscillator signal OSS of an oscillator OSC is present. In this case, the oscillator signal OSS is forwarded as a pulse signal IS to the output of the AND element G2, or to the output of the AD converter unit, as long as the output signal of the first gate G1 is at a high level. If the filter input signal FES falls, the time duration until the rising sawtooth signal SZS reaches the value of the filter input signal FES once per period decreases. The number of pulses output per unit time, thus, decreases as the amplitude of the filter input signal FES falls. Conversely, the time duration until the sawtooth signal SZS reaches the filter input signal FES increases if the filter input signal FES rises. As a result, more pulses of the oscillator signal OSS per unit time can be output at the output of the AD converter unit until the output signal of the first AND element GI changes to a low level.

The counter configuration ZA has at least one counter that counts the pulses of the pulse signal IS that are present at the input. The counter reading of the counter is acquired at regular time intervals and forwarded as digital counter signal ZS to the DA converter unit DA. The evaluation intervals, at the end of which the counter reading of the counter is acquired in each case, may be prescribed by an external synchronization signal or by a further counter in the counter configuration ZA.

The counter of the counter configuration ZA is, preferably, configured as an exclusively up-counting or as an exclusively down-counting counter. Such a counter may be configured as a conventional asynchronous counter. Asynchronous counters have the advantage that they can be realized with a smaller number of logic gates in comparison with synchronous counters.

The amplitude range of the filter input signal FES, or the pulses of the pulse signal IS that are output per evaluation interval, and the maximum counter reading of the at least one counter of the counter configuration ZA are, preferably, coordinated with one another such that the counter overflows at least once within an evaluation interval and starts to count anew at a starting value. If the number of pulses received per evaluation interval corresponds precisely to the number of different counter readings that can be assumed by the counter, then the counter reading does not change at the end of successive evaluation intervals. If the filter input signal FES and, thus, the number of pulses received per evaluation interval rise, then the counter reading at the end of the evaluation intervals rises over time. If the filter input signal FES falls and if fewer pulses are received per evaluation interval, then the counter reading at the end of the evaluation intervals falls over time. A limiting device for the counter reading is, preferably, provided in the counter configuration ZA and prevents the counter reading at the end of the evaluation interval from exceeding a predetermined maximum value or from falling below a predetermined minimum value.

Such a counter configuration ZA with only one counter has an integrating action on the filter input signal FES.

The DA converter unit converts the counter reading ZS fed to it at the end of the evaluation interval into an analog filter output signal FAS. In such a case, the DA converter unit may be a conventional digital-to-analog converter that converts a digital input value ZS into an analog output signal FAS.

Figure 4:
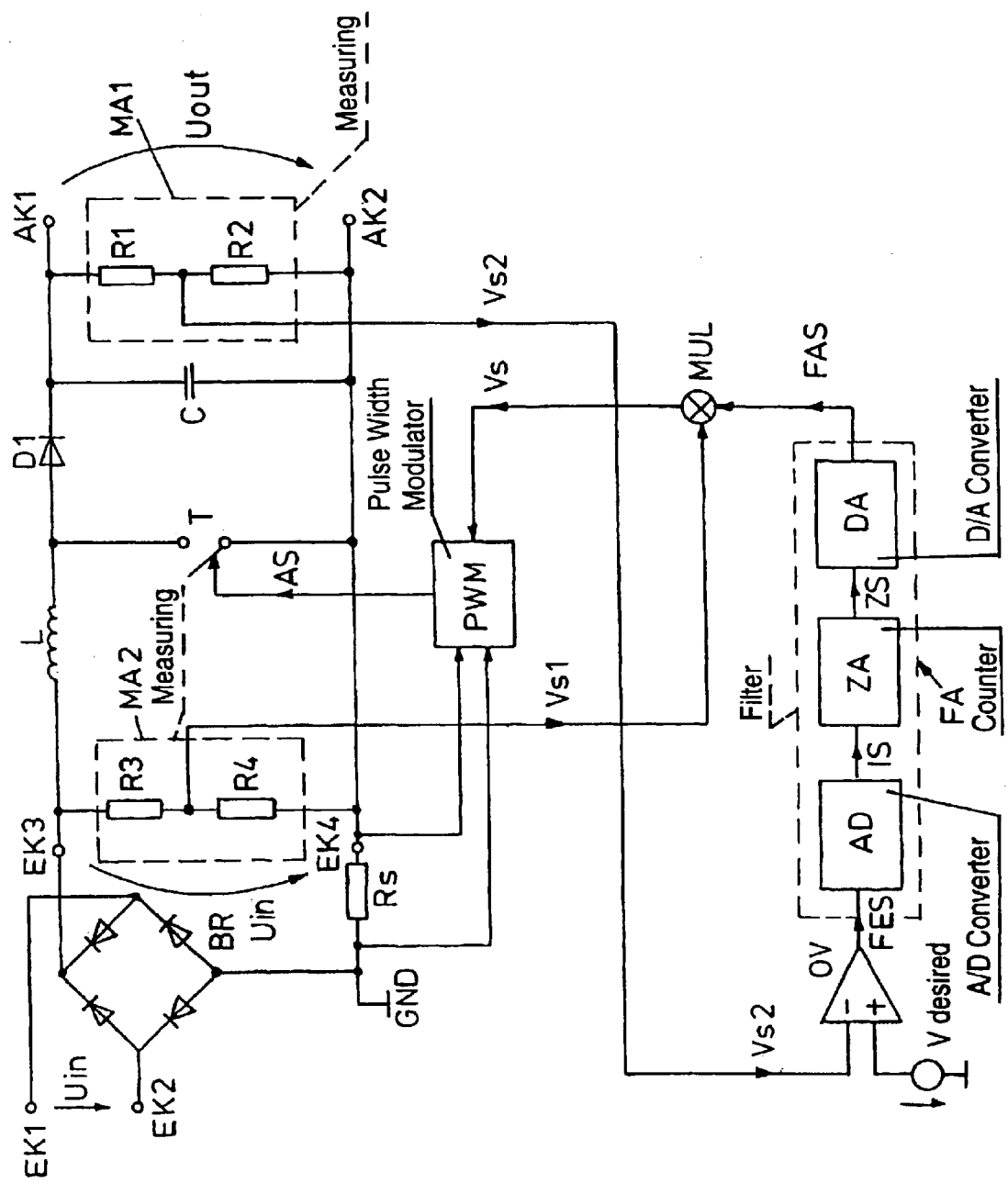
FIG. 4 is a schematic and block circuit diagram of a power factor controller with a filter configuration according to the invention.

FIG. 4 shows, as an exemplary embodiment for the use of the filter configuration according to the invention, a power factor controller in which the filter configuration according to the invention is provided for filtering a fed-back output voltage signal Vs2, which is dependent on an output voltage Uout. The method of operation of the filter configuration according to the invention is explained below in connection with the method of operation of the power factor controller. However, the application of the filter configuration according to the invention is not restricted to the use in a power factor controller. Rather, the filter configuration can be used wherever the intention is to effect low-pass filtering of analog signals with comparatively long time constants to eliminate interference signals. A further area of application is, by way of example, the filtering of analog output signals from sensors.

The task of a power factor controller in accordance with FIG. 4 is to provide, from an alternating input voltage Uin, in particular, a sinusoidal AC voltage having a frequency of 50 Hz or 60 Hz and root-mean-square values of between 90 V and 270 V, an at least approximately constant output voltage Uout at output terminals AK1, AK2, to which a load can be connected. For such a purpose, the sinusoidal AC voltage Uin is firstly converted into a sine-magnitude-shaped voltage Uin' by a bridge rectifier BR, the voltage Uin' being available at terminals EK3, EK4 of the power factor controller. Connected between the terminals EK3, EK4 and the output terminals AK1, AK2 is a so-called boost converter having a series circuit including an inductor L and a switch T, the series circuit being connected to the terminals EK3, EK4, and a series circuit including a diode D1 and a capacitor C, the series circuit being connected in parallel with the switch T, it being possible to tap off the output voltage Uout across the capacitor C, and output terminals of the capacitor C forming the output terminals AK1, AK2 of the power factor controller.

The switch T is driven by a circuit configuration PWM that provides a pulse-width-modulated drive signal AS. The switch T is configured, in particular, as a power transistor. With switch T closed, the storage inductor L takes up energy that it outputs through the diode D1 to the capacitor C or the output terminals AK1, AK2 when switch T has subsequently been opened. The output voltage Uout can be regulated by the pulse width modulator PWM by way of the switch-on frequency and/or the switch-on duration of the switch T.

So that changes in the output voltage Uout dictated by input voltage or dictated by load can be counteracted by a suitable driving of the switch T, provision is made of a measuring configuration MA1 for detecting the output voltage Uout. In the exemplary embodiment, the measuring configuration MA1 has a series circuit of two resistors R1, R2 between the output terminals AK1, AK2, it being possible for an output voltage signal Vs2 dependent on the output voltage Uout to be tapped off at a node that is common to the two resistors R1, R2. The output voltage signal Vs2 is fed to a first input of an operational amplifier OV, at whose other input a reference signal Vdesired is present. A signal FES dependent on the difference between the reference signal Vdesired and the output voltage signal Vs2 is present at the output of the operational amplifier OV.

The value of the output voltage Uout, or of a signal dependent thereon, is required in the pulse width modulator PWM for driving the switch T or for readjusting the output voltage Uout. It is unfavorable that a hum signal is superposed on the output voltage Uout in power factor controllers, the frequency of the hum signal amounting to twice the frequency of the input voltage Uin. To prevent this hum signal from adversely affecting the regulation of the output voltage Uout by the pulse width modulator PWM, the fed-back output voltage signal Vs2, or the signal present at the output of the operational amplifier OV, needs to be filtered to eliminate the hum components.

To filter the fed-back signal Vs2, a filter configuration according to the invention having an AD converter unit AD, a counter configuration ZA and a DA converter unit DA is connected downstream of the operational amplifier OV. The signal that is dependent on the difference between the reference signal Vdesired and the output voltage signal Vs2 and is present at the output of the operational amplifier OV is fed to the AD converter unit as filter input signal FES.

In addition to a voltage regulating circuit for regulating the output voltage Uout, the power factor controller illustrated has a current regulating circuit, whose task is to set an inductor current IL whose average value is proportional to the voltage Uin'. To detect the instantaneous value of the inductor current IL, provision is made of a current sensing resistor Rs in series with the inductor L, a voltage tapped off across the current sensing resistor Rs being fed to the pulse width modulator PWM. In the pulse width modulator PWM, the temporal profile of the inductor current IL is compared with a voltage signal Vs dependent on the input voltage Uin', which voltage signal results from the multiplication of an input voltage signal Vs1, formed by the measuring configuration, by the filter output signal FAS.

If we disregard the interference signals superposed on the output voltage Uout, which are filtered out by the filter configuration, then the output voltage Uout changes slowly in relation to the frequency of the input voltage Uin, or of the input voltage signal Vs1. The filter output signal FAS can, therefore, be assumed to be constant at least over some periods of the input voltage signal Vs1. The voltage signal Vs fed to the pulse width modulator PWM contains the information about the temporal profile of the input voltage Uin for the regulation of the current consumption. Changes in the root-mean-square value of the voltage signal Vs can result from changes in the output voltage Uout or in the filter output signal FAS and can, thus, be used for regulating the output voltage Uout.

A pulse width modulator PWM for driving a switch in a power factor controller such that a sinusoidal current consumption is present and the output voltage Uout is at least approximately constant for wide ranges of the input voltage Uin and for different loads is prior art, and so a detailed description of the construction is dispensed with. An example of such a pulse width modulator PWM is the MC 34261 module from the company Motorola.

The counter configuration ZA of the filter configuration FA according to the invention may be configured for the application in the power factor controller such that it has only one counter, which, preferably, effects only up-counting or only down-counting, the counter reading of the counter being evaluated at the end of regularly recurring evaluation intervals and being fed to the DA converter unit. A filter configuration having such a counter configuration acts as an I regulator in the voltage regulating circuit of the power factor controller. In such a case, the filter output signal FAS corresponds to the integral of the filter input signal FES. The output voltage signal Vs2 and the reference signal Vdesired, or the filter input signal FES formed from the difference between these two signals by the operational amplifier OV, the AD converter unit and the counter of the counter configuration ZA are, preferably, coordinated with one another such that when the output voltage signal Vs2 assumes the value of the reference signal Vdesired, per evaluation interval there are precisely so many pulses present at the counter that the counter overflows once and, at the end of the evaluation interval, has the same counter reading as at the end of the previous evaluation interval. If the output voltage signal Vs2 falls, more pulses are generated per evaluation interval and the counter reading at the end of the evaluation intervals rises over time. If the output voltage signal Vs2 rises, then the number of pulses output to the counter configuration ZA per evaluation interval decreases and the counter reading at the end of the evaluation intervals falls over time.

Figure 5:
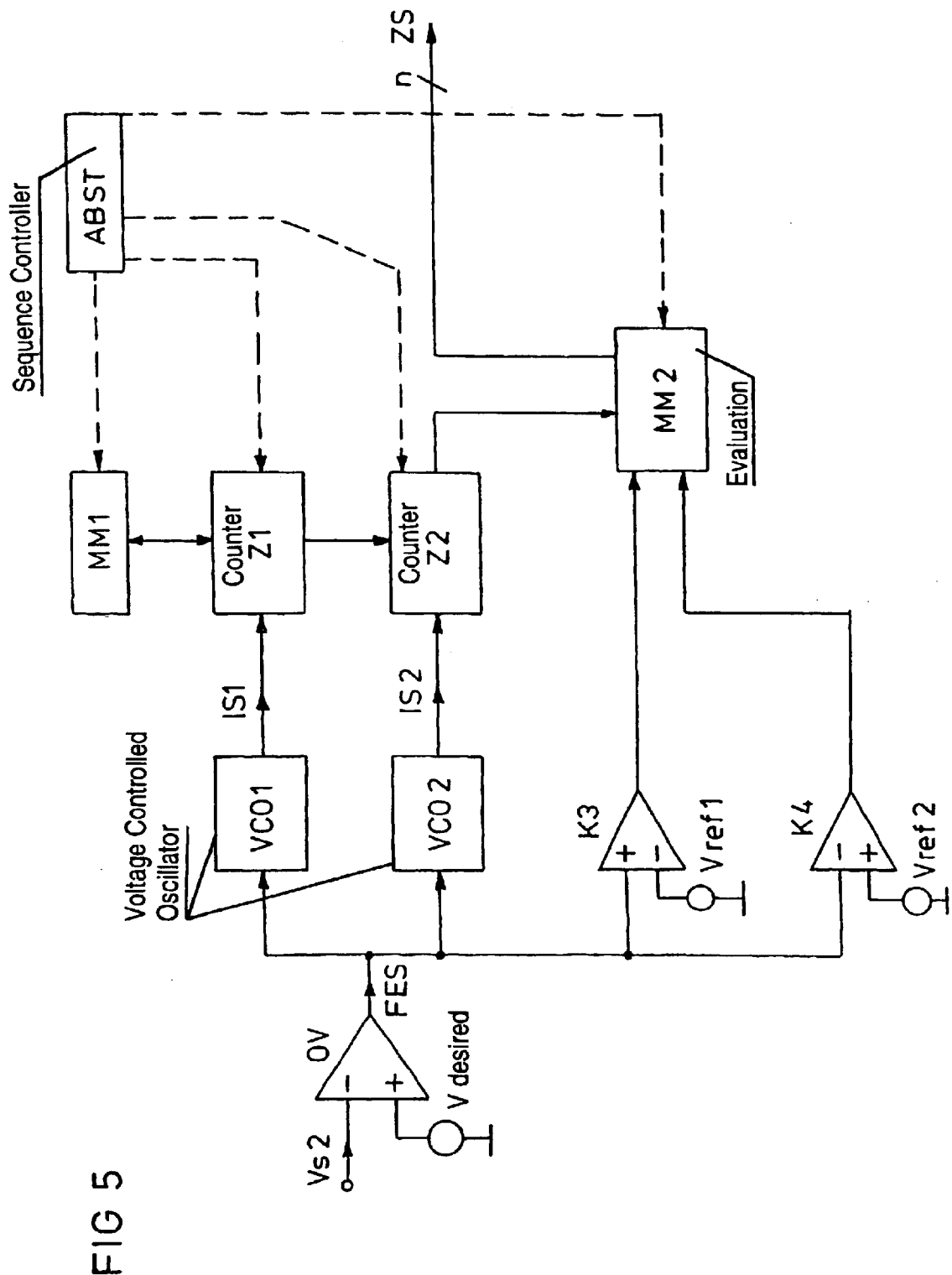
FIG. 5 is a schematic and block circuit diagram of a first embodiment of a counter configuration according to the invention.

FIG. 5 shows a block diagram of a circuit configuration that realizes an AD converter unit AD with a counter configuration ZA connected downstream. For reasons of clarity, the operational amplifier OV is also illustrated, the output voltage signal Vs2 being fed to one of its inputs and the reference signal Vdesired being fed to its other input. The filter input signal FES present at the output of the operational amplifier OV is fed to a first voltage-controlled oscillator VCO1 and to a second voltage-controlled oscillator VCO2. A first pulse signal IS1 present at the output of the first voltage-controlled oscillator VCO1 is fed to a first counter Z1, and a second pulse signal IS2 present at the output of the second voltage-controlled oscillator VCO2 is fed to a second counter Z2. The reference signal Vdesired is coordinated with the range of fluctuation of the output voltage signal Vs2 such that the filter input signal FES does not become zero, but, rather, assumes values at which the voltage-controlled oscillators VCO1, VCO2 output clocked signals IS1, IS2. The frequency of the clocked signals IS1, IS2 is dependent on the magnitude of the filter input signal FES. The first and second counters Z1, Z2 are, preferably, asynchronous counters that effect exclusively up-counting. Such counters Z1, Z2 can be realized in a simple manner and with a small number of logic gates in comparison with synchronous counters. The counter reading of the first counter Z1 is incremented with each pulse of the pulse signal IS1 and the counter reading of the second counter Z2 is incremented with each pulse of the pulse signal IS2. The first counter Z1 is connected to the second counter Z2 to set the counter reading of the second counter Z2, at the beginning of each evaluation interval, to the value of the counter reading of the first counter Z1 at the end of the preceding evaluation interval.

The first counter Z1 is connected to a first evaluation device MM1, which compares the counter reading of the first counter Z1 at the end of the evaluation interval with an upper threshold value and a lower threshold value. In such a case, if the counter reading of the first counter Z1 is greater than the upper threshold value, then the counter reading of the first counter Z1 is set to the upper threshold value. If the counter reading of the first counter Z1 is less than the lower threshold value, then the counter reading of the first counter Z1 is set to the lower threshold value. Before the beginning of a subsequent evaluation interval, the second counter Z2 is set to the final reading of the first counter Z1 in the preceding evaluation interval. Proceeding from the counter reading set, the second counter Z2 is incremented with each pulse of the second pulse signal IS2 during the evaluation interval. At the end of the evaluation interval, the counter reading of the second counter Z2 is fed to a second evaluation unit MM2, which has an output at which the counter output signal ZS can be tapped off. The second evaluation unit MM2 is, furthermore, fed the output signals of a comparator K3 and of a comparator K4, the comparator K3 comparing the filter input signal FES with a first reference signal Vref1 and the comparator K4 comparing the filter input signal FES with a second reference signal Vref2. If the filter input signal FES is within a range prescribed by the first reference signal Vref1 and the second reference signal Vref2, then the counter reading of the second counter Z2 is forwarded directly as counter output signal ZS by the second evaluation unit MM2 at the end of each evaluation interval. If the filter input signal FES lies above the first reference signal Vref1, then, instead of the counter reading of the second counter Z2, an upper counter reading stored in the evaluation unit MM2 is output as counter output signal ZS. Moreover, if the filter input signal FES is below the second reference signal Vref2, then, instead of the counter reading of the second counter Z2, a stored lower counter reading is output as counter output signal ZS by the second evaluation unit MM2.

The counter output signal ZS, which is a digital value having the word length n in the example in accordance with FIG. 5, is composed of the counter reading of the first counter Z1 at the end of an evaluation interval and the value by which the second counter Z2 is incremented by the pulses of the second pulse signal IS2 in the succeeding evaluation interval. In such a case, the counter reading of the first counter Z1, to which the second counter Z2 is set at the beginning of an evaluation interval, represents an integrating component of the counter output signal ZS, or of the filter output signal FAS formed therefrom. The value by which the second counter Z2 is incremented proceeding from the set counter reading within an evaluation interval represents the proportional component of the counter output signal ZS, or of the filter output signal FAS formed therefrom. A filter configuration in accordance with FIG. 5 acts as a proportional-integral regulator if it is used in a regulating circuit for filtering sensor signals, in particular, for filtering an output voltage signal in the voltage regulating circuit of a power factor controller according to FIG. 4. In such a case, the evaluation unit MM1 limits the integrating component of the counter output signal ZS and the evaluation unit MM2 limits the counter output signal ZS depending on the filter input signal FES. The first and second counters are coordinated with one another such that the proportional component of the counter reading is subject to a greater amplification than the integrating component.

The first and second counters Z1, Z2 and the evaluation units MM1, MM2 are connected to a sequence controller ABST, which, inter alia, prescribes the evaluation intervals within which the first and second counters Z1, Z2 are incremented depending on the pulse signals IS1, IS2 and at the end of which the counter reading of the second counter Z2 is output as counter output signal ZS. In this case, the evaluation intervals each have the same length. In this case, the temporal sequence of the individual evaluation intervals may be chosen such that the next evaluation interval begins immediately with the end of one evaluation interval, or that there is a temporal gap between the individual evaluation intervals. In this case, the temporal gap between the evaluation intervals may be fixedly prescribed or the individual evaluation intervals may each be started by a synchronization signal.

Figure 6:
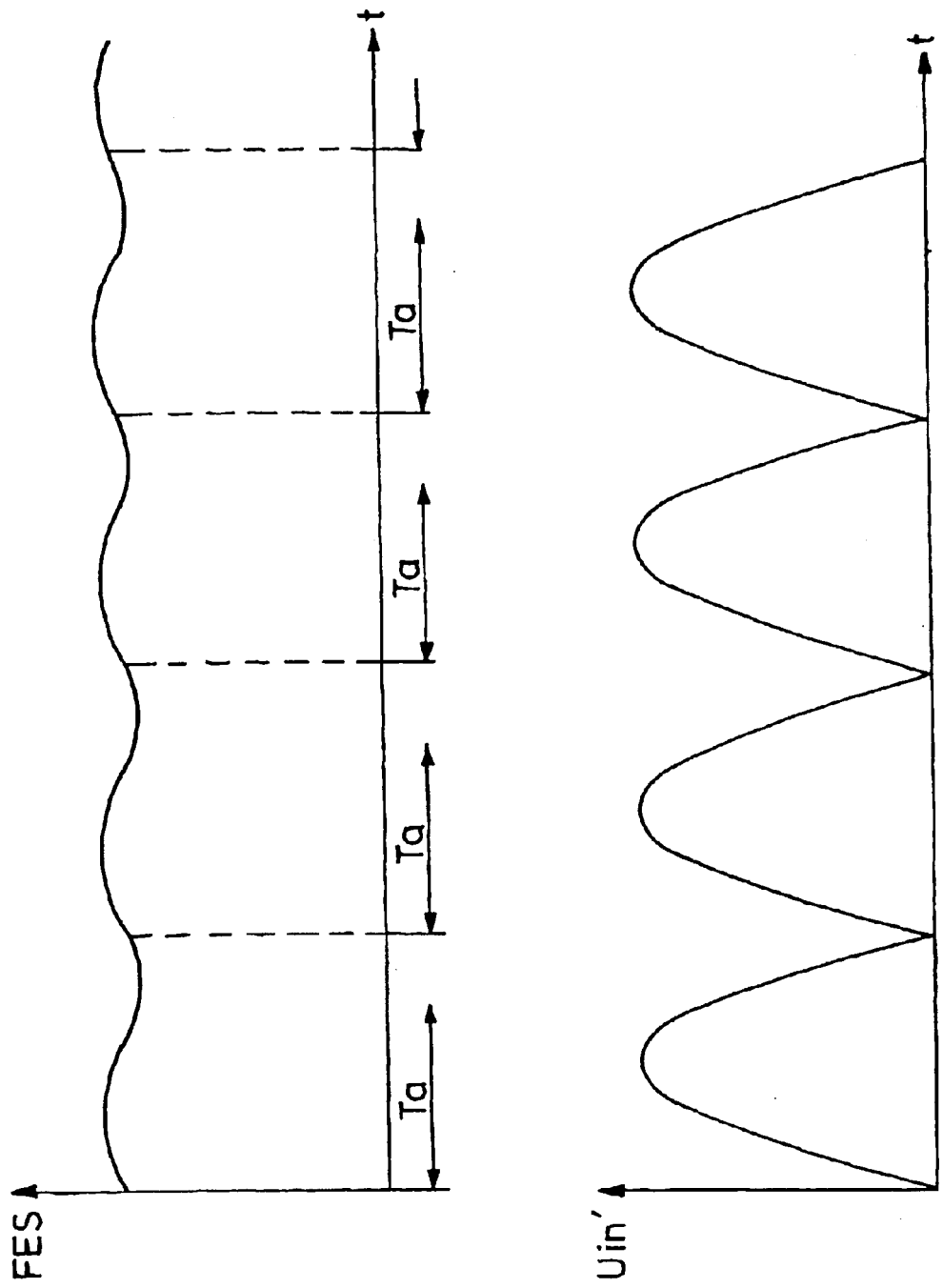
FIG. 6A is a graph illustrating an example of a temporal profile of a filter input signal.
FIG. 6B is a graph illustrating an example of a temporal profile of a sine-magnitude-shaped voltage.

FIGS. 6A and 6B show the typical signal profile of a filter input signal in a voltage regulating circuit of a power factor controller. The filter input signal FES results from the difference between the reference signal Vdesired and the output voltage signal Vs2. In power factor controllers, a hum signal is superposed on the output voltage signal Vs2, which hum signal is periodic with twice the frequency of the sinusoidal input voltage Uin or with the frequency of the sine-magnitude-shaped voltage Uin'. The duration of the evaluation intervals Ta is, preferably, chosen to be shorter than the period duration of the hum signal. The evaluation intervals Ta, preferably, begin in a manner dependent on the temporal profile of the hum signal or the temporal profile of the sine-magnitude-shaped input signal UinT. For filtering a signal in accordance with FIGS. 6A and 6B, it is advantageous if the evaluation intervals Ta each begin when the input signal Uin' has a minimum, and if the duration of the evaluation intervals Ta is chosen to be shorter than the period duration of the input signal Uin' or of the hum signal.

For power factor controllers that are intended to be used for sinusoidal AC voltages at 50 Hz or 60 Hz, the duration of the evaluation intervals is, preferably, 8 ms. In the case of the associated period durations of 10 ms or 8.3 ms of the sine-magnitude-shaped AC voltage signals, there, then, also remains a temporal reserve of 2 ms or 0.3 ms between the individual evaluation intervals Ta.

The method of operation of the filter configuration in accordance with FIG. 5 is explained below using numerical examples. It shall be assumed that the first voltage-controlled oscillator VCO1 has a center frequency of 32 kHz, a minimum frequency of 28 kHz and a maximum frequency of 36 kHz. It is, furthermore, assumed that the second voltage-controlled oscillator VCO2 has a center frequency of 16 kHz, a minimum frequency of 4 kHz, and a maximum frequency of 28 kHz. The first and second counters Z1, Z2 are, preferably, 8-bit counters that each have the same counter reading again after 256 pulses. The first counter Z1 receives a minimum of 224 and a maximum of 288 pulses from the first voltage-controlled oscillator VCO1 within a sampling interval Ta of 8 ms. Consequently, at the end of an evaluation interval, its counter reading is a maximum of 32 higher or a maximum of 32 lower than before. The first counter Z1 is configured as an up-counter, its counter reading is not reset and it is, thus, responsible for the integrating component of the filter output signal FAS. Proceeding from the counter reading of the first counter Z1 at the end of the preceding evaluation interval Ta, the second counter Z2 counts on by a minimum of 32 and a maximum of 224 pulses at the beginning of an evaluation interval Ta, depending on the frequency of the voltage-controlled oscillator VCO2. While the first counter Z1 can increase the counter reading of the second counter Z2 by a maximum of 32 at the beginning of the next evaluation interval, the second counter Z2 can be incremented by up to 224 within a sampling interval. The value by which the second counter Z2 is incremented within a sampling interval corresponds to the proportional component of the filter output signal FAS. In the exemplary embodiment, the proportional component is, therefore, subject to a significantly greater amplification than the integrating component.

Figure 7:
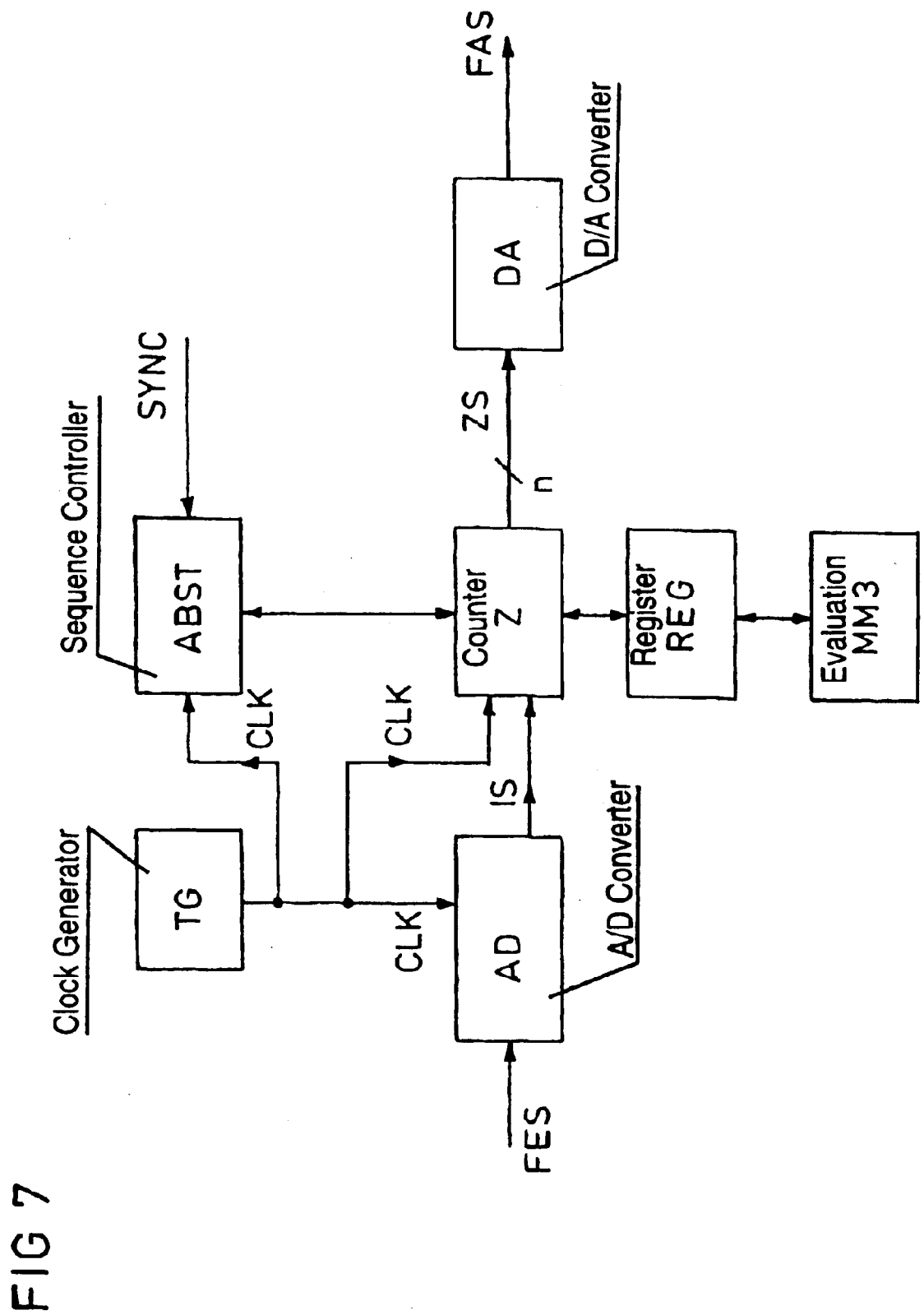
FIG. 7 is a block diagram of a second embodiment of a counter configuration according to the invention.

FIG. 7 shows a further exemplary embodiment of a filter configuration according to the invention. In this case, the filter input signal FES is fed to an analog-to-digital converter unit AD, at whose output a pulse signal IS is present, the number of pulses output per unit time being dependent on the amplitude of the filter input signal FES. The AD converter unit is, preferably, a sigma-delta converter. The pulse signal IS is fed to a counter Z, which provides a counter output signal ZS for a digital-to-analog converter unit DA, which provides, from the counter output signal ZS, an analog filter output signal FAS dependent on the counter output signal ZS. The counter output signal ZS is a digital value having the word length n. The counter Z is connected to a sequence controller ABST, which, inter alia, prescribes the beginning and the duration of the evaluation intervals, a synchronization signal SYNC that prescribes the beginning of the evaluation intervals being fed to the sequence controller ABST. The AD converter unit AD, the counter Z and the sequence controller ABST are fed a clock signal CLK by a clock generator TG. Furthermore, a register REG for storing a counter reading is connected to the counter Z, the register REG being connected to an evaluation unit MM3 for the evaluation of a stored register value.

Figure 8:
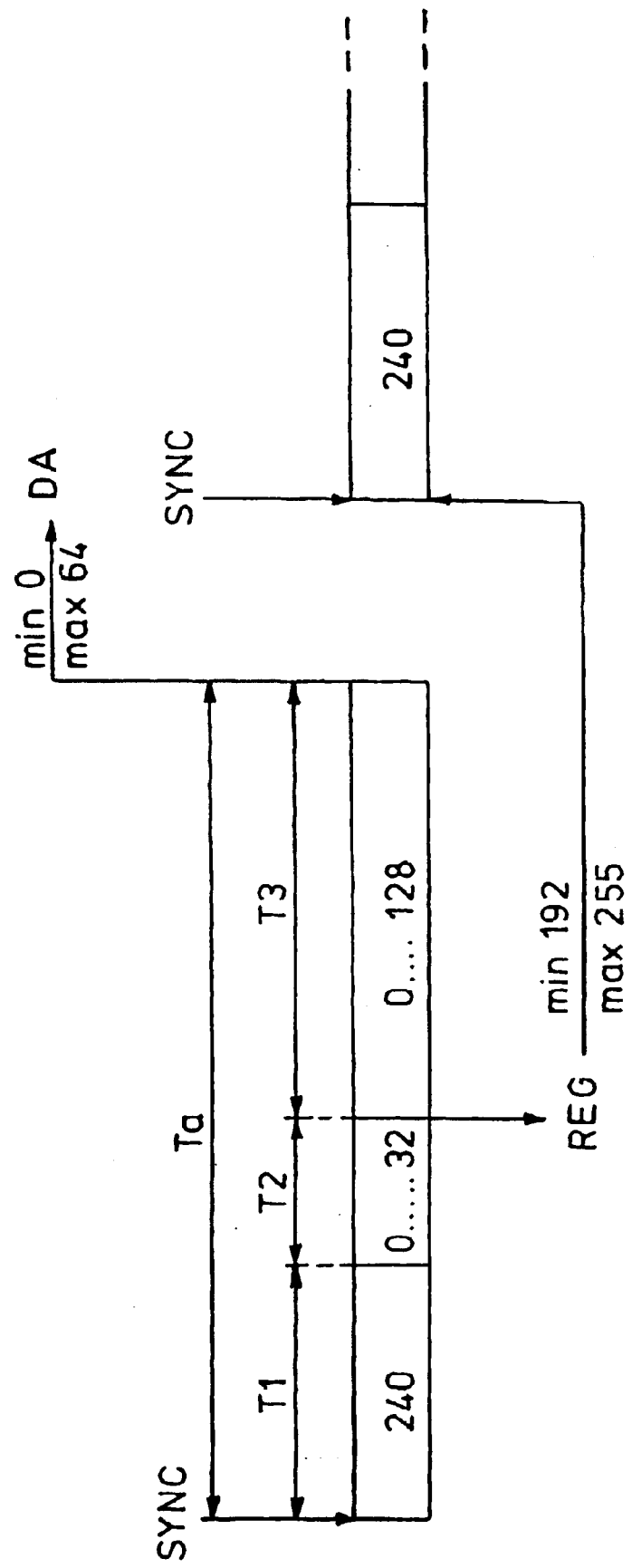
FIG. 8 is a diagrammatic illustration of the method of operation of the counter configuration according to FIG. 6.

The method of operation of the filter configuration in accordance with FIG. 7 is explained below with reference to the diagram in FIG. 8. The evaluation interval Ta begins with a pulse of the synchronization signal SYNC to the sequence controller ABST. Within a first time interval T1 at the beginning of the evaluation interval Ta, the counter Z is incremented by a predetermined number of pulses by the clock signal CLK. Afterward, the counter reading of the counter Z is increased by 1 with each pulse of the pulse signal IS within a second time interval T2. At the end of the second time interval T2, the instantaneous counter reading of the counter Z is stored in the register REG. The stored register value is compared with a lower threshold value and an upper threshold value by the evaluation unit MM3. If the register value is less than the lower threshold value, then the lower threshold value is written to the register, and if the register value is greater than the upper threshold value, then the upper threshold value is written to the register. In a third time interval T3 following the second time interval T2, the counter Z is incremented further by the pulses of the pulse signal-IS until the end of the evaluation interval Ta. At the beginning of the subsequent evaluation interval, the counter reading of the counter Z is set to the value stored in the register.

To provide a better understanding, the method of operation will be explained again using numerical examples (illustrated in FIG. 8). It is assumed that the counter Z is an 8-bit counter that can, thus, assume 256 different counter readings. During the first time interval T1, the counter reading of the first counter Z is increased by precisely 240. The second time interval T2 and the analog-to-digital converter unit are coordinated with one another such that the AD converter unit can output between 0 and 32 pulses within the second time interval T2. The counter Z has, thus, received between 240 and 272 pulses at the end of the second time interval T2. Its counter reading is, thus, a maximum of 16 below the counter reading at the beginning or a maximum of 16 above the counter reading at the beginning. If the AD converter unit outputs 16 pulses within the second time interval T2, then the counter reading of the second counter Z, which is written to the register at the end of the second time interval T2, is unchanged from the initial value. The register REG checks whether or not the counter reading is at least 192 and at most 255. If the counter reading is below 192, then the value of the register is set to 192, and if the value of the register is above 255, then the value of the register is set to 255. The counter reading at the beginning of the evaluation interval is, thus, between 192 and 255 so that the counter reading at the beginning of the second time interval T2 may be between 192 and 287, the latter being represented as 31. After the third time segment, the counter reading of the counter Z may be between 192 and a maximum of 415, the latter being represented as 159. The counter Z cannot assume the values 160 to 191.

The counter Z, preferably, contains a further evaluation unit (not specifically illustrated here) that checks the counter reading at the end of the evaluation interval Ta. If the counter reading after the third time segment T3 or at the end of the evaluation interval Ta is between 192 and 255, then a counter reading 0 is output as counter output signal ZS. If the counter reading is between 0 and 63, then the counter reading is output as counter output signal ZS, and if the counter reading is between 64 and 159, a 63 is forwarded to the DA converter unit DA. A discrimination into the three ranges mentioned is possible using the three most significant bits of the counter reading.

The counter reading at the end of the second time interval forms the integrating component of the counter output signal, which is adopted at the beginning of the next evaluation interval Ta. The change in the counter reading within the third time interval T3 forms the proportional component of the counter output signal ZS or of the filter output signal FAS.

As becomes clear from the numerical examples, the latter are chosen such that the proportional component, which is between 0 and 128, can overcompensate the integrating component, which is between 199 and 255 (this corresponds to negative values between −64 and −1). The filter configuration in accordance with FIG. 7, which can be used as a regulator, for example, in a voltage regulating circuit of a power factor controller, thus, contains a ramp-up protection. If the filter input signal FES falls sharply on account of a load shedding when using a filter configuration in accordance with FIG. 7 in a power factor controller in accordance with FIG. 4, then a 0 can be fed to the DA converter unit at the latest within the next evaluation interval. As a result, the filter output signal FAS, likewise, assumes the value 0, and the switch T is not driven through the pulse width modulator.

Figure 9:
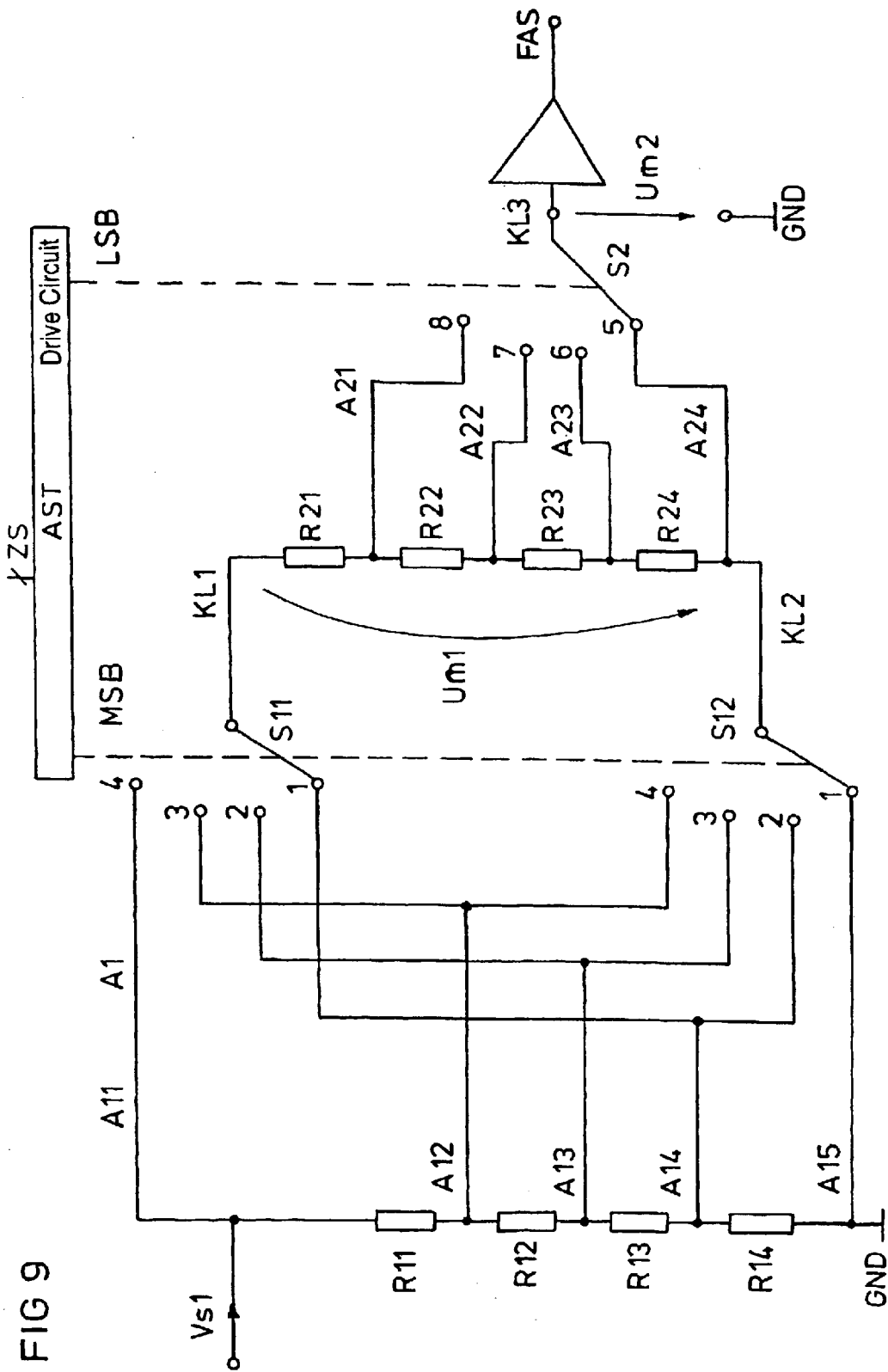
FIG. 9 is a schematic and block circuit diagram of an embodiment of a multiplying DA converter unit according to the invention.

FIG. 9 shows an exemplary embodiment of a DA converter unit that converts the digital counter output signal ZS into an analog filter output signal FAS. The DA converter unit illustrated is, furthermore, able to multiply an analog signal corresponding to the counter output signal ZS by a further analog signal Vs1. When using a DA converter unit in accordance with FIG. 9 in a power factor controller in accordance with FIG. 4, the counter output signal ZS and the input voltage signal Vs1 can be fed directly to the DA converter unit, as a result of which the multiplier MUL can be dispensed with.

The DA converter unit illustrated has a series circuit of four resistors R11, R12, R13, R14, which are connected between a terminal for feeding in the input signal Vs1 and a terminal for reference-ground potential GND. The resistors R11, R12, R13, R14, preferably, have different values. By a first switch configuration S11, S12, it is possible to tap off in each case the voltage across one of the resistors R11, R12, R13, R14, which is present as first voltage Um1 between terminals KL1, KL2. The first switch configuration has a first switch S11, which optionally connects the first terminal KL1 to the input terminal A11, at which the input signal Vs1 is present, to a voltage tap A12 between the resistor R11 and the resistor R12, to a voltage tap A13 between the resistor R12 and the resistor R13 or to a voltage tap A14 between the resistor R13 and the resistor R14. The second switch S12 connects the second terminal KL2 to the voltage tap A12, the voltage tap A13, the voltage tap A14, or the voltage tap A15 at reference-ground potential GND. The first and second switches S11, S12 are coupled to one another so that in a switch position 1 the voltage across the resistor R14, in a switch position 2 the voltage across the resistor R13, in a switch position 3 the voltage across the resistor R12, and in a switch position 4 the voltage across the resistor R11 is present at the terminals KL1, KL2.

A further four resistors R21, R22, R23, R24 are connected in series between the connection terminals KL1, KL2. A first voltage tap A21 is provided between the resistors R21 and R22, a second voltage tap A22 is provided between the resistors R22 and R23, a third voltage tap A23 is provided between the resistors R23 and R24, and a fourth voltage tap A24 is provided at the terminal KL2. A second switch configuration S2 optionally connects an output terminal KL3 to one of the voltage taps A21 to A24. A second voltage Um2 can be tapped off at the terminal KL3, which second voltage is converted into the filter output signal FAS by an amplifier stage connected downstream.

The DA converter unit illustrated is able to convert a counter output signal ZS having a length of 4 bits into an analog filter output signal FAS. The switch configurations S11, S12, S2 are driven by a drive circuit AST, to which the counter output signal ZS is fed. In such a case, the first switch configuration S11, S12 is driven according to the two more significant bits MSB of the counter output signal ZS and the second switch configuration S2 is driven according to the less significant bits MSB of the counter output signal ZS. The resolution of the DA converter unit can be increased by correspondingly longer resistor chains with more voltage taps and/or cascading of further configurations with resistor chains and switches.

Figure 10:
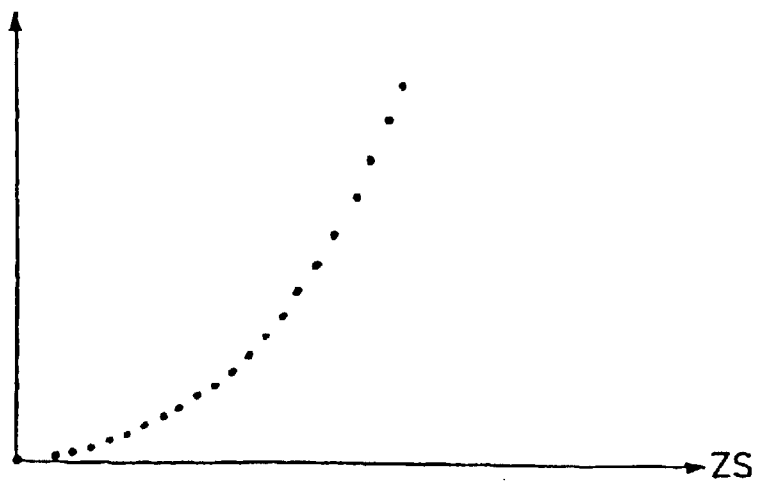
FIG. 10 is a graph illustrating a transfer function of the DA converter unit according to FIG. 8.

The values of the resistors of the DA converter unit are, preferably, chosen such that the DA converter unit has a quadratic or exponential transfer function, that is to say, the second voltage signal Um2 or the filter output signal FAS rises quadratically or exponentially with the value of the counter output signal ZS given a constant input signal Vs1. FIG. 10 shows, by way of example, an exponential profile of the transfer function of such a DA converter unit. As can be seen, the filter output signal FAS increases exponentially as the counter reading increases, a constant voltage being assumed as input signal Vs1.

A DA converter unit having such a transfer response is, preferably, used in filter configurations in the voltage regulating circuit of a power factor controller in so-called wide-range switched-mode power supplies. Such switched-mode power supplies are intended to be able to provide approximately constant output voltages for input voltages having root-mean-square values of between 90 V and 270 V.

In the exemplary embodiment in accordance with FIG. 4, the measuring configuration MA2 for providing the input voltage signal Vs1 is configured as a simple voltage divider including two resistors R3, R4. In the case of power factor controllers that are intended to be able to provide an approximately constant output voltage for input voltages Uin having root-mean-square values of between 90 V and 270 V, it is desirable, as is described, for example, in U.S. Pat. No. 5,359,276 to Mammano, to subdivide the range of fluctuation of the input voltage Uin into at least two sections, the sine-magnitude-shaped signal Uin' being multiplied by two different factors, depending on whether the input voltage signal Uin originates from the first or second voltage section.

Figure 11:
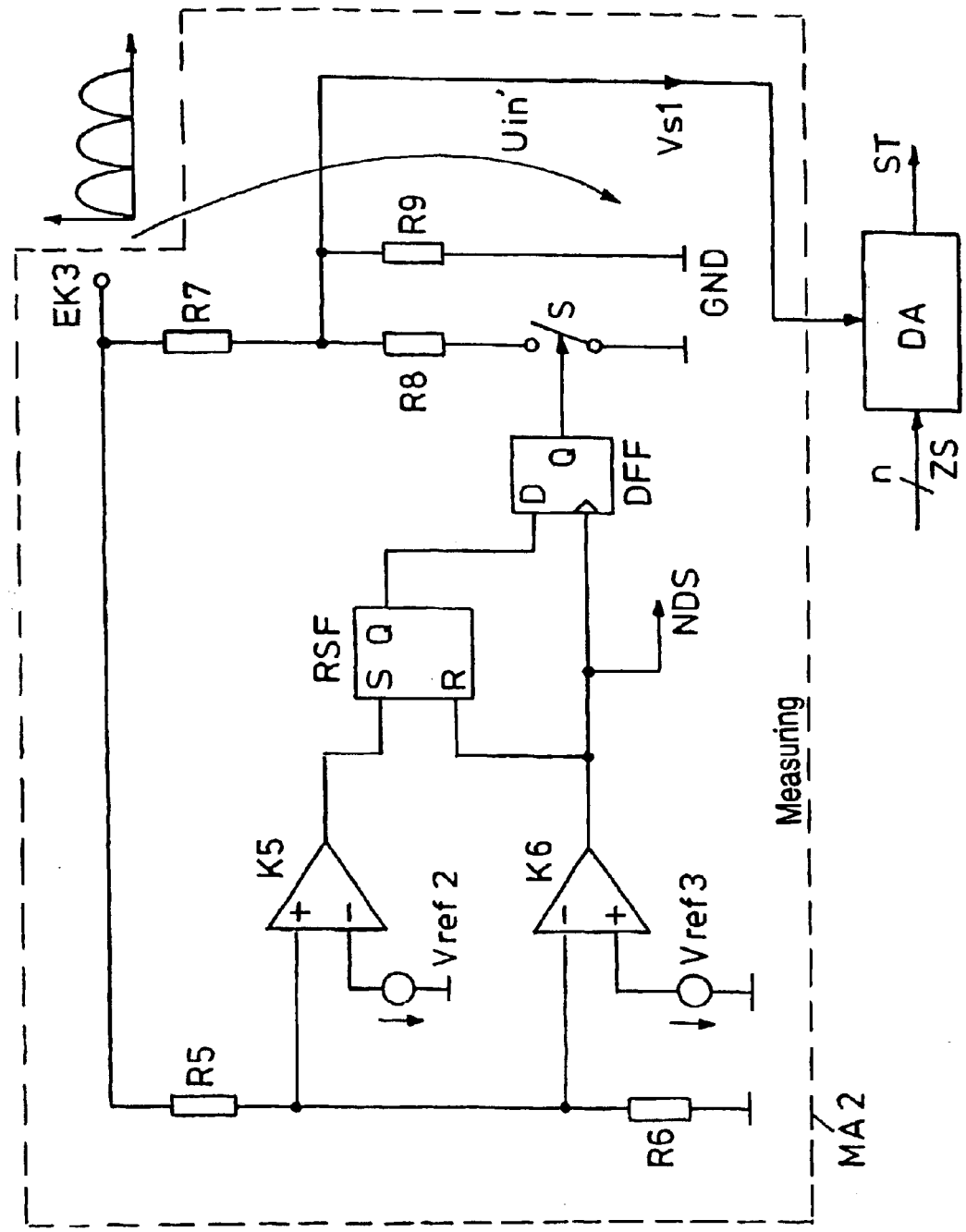
FIG. 11 is a schematic and block circuit diagram of an embodiment of a measuring configuration for providing a signal dependent on the input voltage in a power factor controller according to the invention.

FIG. 11 shows an exemplary embodiment of a measuring configuration MA2 for providing an input voltage signal Vs1 from the voltage signal Uin' depending on the peak value of the voltage signal Uin'.

The measuring configuration MA2 has a voltage divider between the terminal EK3 and a terminal for reference-ground potential GND. The voltage divider has two parallel-connected resistors R8, R9, with which a further resistor R7 is connected in series. In series with the resistor R8 there is a switch S, through which the resistor R8 can be connected in to the voltage divider. The input voltage signal Vs1 can be tapped off at a node common to the resistors R7, R8, R9. To provide a better understanding, FIG. 11 furthermore illustrates the DA converter unit, which is fed the input voltage signal Vs1 in the power factor controller.

The measuring configuration MA2 has a further voltage divider between the terminal EK3 and reference-ground potential GND, which includes a series circuit of two resistors R5, R6. A node common to the two resistors R5, R6 is connected to the noninverting input of a first comparator K5 and the inverting input of a second comparator K6. A first reference signal Vref2 is fed to the inverting input of the first comparator K5 and a second reference signal Vref3 is fed to the noninverting input of the second comparator K6. An output of the first comparator K5 is connected to the set input of an RS flip-flop RSF connected downstream and an output of the second comparator K6 is connected to the reset input of the RS flip-flop RSF. Furthermore, the output of the second comparator K6 is connected to the clock input of a D-type flip-flop DF, to whose data input D the noninverting output Q of the RS flip-flop RSF is connected. The switch S in series with the resistor R8 is driven through the noninverting output Q of the D-type flip-flop DF.

The RS flip-flop RSF is set if the voltage across the resistor R6 exceeds the value of the first reference signal Vref2, and reset if the voltage across the resistor R6 falls below the value of the second reference signal Vref3. The D-type flip-flop DF, which is clocked by the output of the second comparator K6, accepts the value of the RS flip-flop RSF at a point in time before the voltage across the resistor R6 has fallen below the value of the second reference signal Vref3. If this voltage has previously exceeded the value of the first reference signal Vref2, then the D-type flip-flop DFF accepts a 1 from the RS flip-flop and the switch S is closed. If the voltage across the resistor R6 has not exceeded the value of the first reference signal Vref2, then the D-type flip-flop DFF accepts a 0 and the switch S is opened. The second reference voltage Vref3 is, preferably, chosen such that it identifies the zero crossings of the voltage signal Uin' or of the voltage that is present at the resistor R6 and is derived thereon. In the case of input voltages Uin' having small peak values, the switch S is open and the input voltage Uin' is divided down through the series circuit of the resistors R7 and R9 for the purpose of forming the input voltage signal Vs1. If the switch S is closed in the case of input voltages having large peak values, the input voltage Uin' is divided down to a greater extent owing to the smaller resistance of the resistors R8, R9 connected in parallel.

I claim:

1. A filter configuration for filtering an analog signal, comprising:
   an analog-to-digital converter unit having:
      an input for receiving an analog filter input signal having a magnitude; and
      an output supplying a pulse signal having a sequence of pulses, a number of said pulses per unit time being dependent on the magnitude of the filter input signal;
   a counter configuration being connected to said output of said analog-to-digital converter unit and receiving said pulse signal from said analog-to-digital converter unit,, said counter configuration having at least one counter supplying a counter reading having a value; and
   a digital-to-analog converter unit connected to said counter configuration, said counter configuration supplying said
   counter reading to said digital-to-analog converter unit in each case once during an evaluation interval and forming an analog filter output signal having an amplitude dependent upon said value of said counter reading; and
   wherein said pulse signal and said evaluation interval are coordinated with one another to cause said at least one counter to overflow at least once within said evaluation interval.

2. The filter configuration according to claim 1, wherein said at least one counter effects exclusively up-counting or down-counting.

3. The filter configuration according to claim 1, wherein:
   said at least one counter starts to count at an initial value and has a minimum or maximum counter reading; and
   upon reaching said minimum or maximum counter reading, said at least one counter starts to count at said initial value again.

4. The filter configuration according to claim 1, wherein said analog-to-digital converter unit has at least one voltage-controlled oscillator.

5. The filter configuration according to claim 1, wherein said analog-to-digital converter unit is a sigma-delta converter.

6. A filter configuration for filtering an analog signal, comprising:
   an analog-to-digital converter unit having:
      an input for receiving an analog filter input signal having a magnitude; and
      an output supplying a pulse signal having a sequence of pulses, a number of said pulses per unit time being dependent on the magnitude of the filter input signal;
   a counter configuration being connected to said Output of said analog-to-digital converter unit and receiving said pulse signal from said analog-to-digital converter unit, said counter configuration having at least one counter supplying a counter reading having a value; and a digital-to-analog converter unit connected to said counter configuration, said counter configuration supplying said counter reading to said digital-to-analog converter unit in each case once during an evaluation interval and forming an analog filter output signal having an amplitude dependent upon said value of said counter reading;

said analog-to-digital converter unit having:
a signal generator configuration for providing a reference signal rising continuously in sections; and
a clock generator:

said analog-to-digital converter unit comparing said reference signal and the analog filter input signal; and said analog-to-digital converter unit supplying said pulse signal as a clock signal at said output dependent upon said comparison of said reference signal and the analog filter input signal.

7. A filter configuration for filtering an analog signal, comprising:
an analog-to-digital converter unit having:
an input for receiving an analog filter input signal having a magnitude; and
an output supplying a pulse signal having a sequence of pulses, a number of said pulses per unit time being dependent on the magnitude of the filter input signal;
a counter configuration connected to said output of said analog-to-digital converter unit and receiving said pulse signal from said analog-to-digital converter unit, said counter configuration having at least one counter supplying a counter reading having a value, and outputting an output signal; and
a digital-to-analog converter unit connected to said counter configuration, said counter configuration supplying said counter reading to said digital-to-analog converter unit in each case once during an evaluation interval and forming an analog filter output signal having an amplitude dependent upon said value of maid counter reading; and
wherein a further signal is supplied to said digital-to-analog converter unit, and said digital-to-analog converter unit multiplies said further signal by said output signal of said counter configuration.

8. The filter configuration according to claim 7, wherein said digital-to-analog converter unit has:
an output terminal providing said analog filter output signal; a first series circuit having k resistors and k+1 voltage taps, a voltage dependent on said further signal being present across said first series circuit;
at least one second series circuit having:
first and second connection terminals;
m resistors; and
m voltage taps;
a first switch having a first and second contact pair connecting said first and second connection terminals to two different voltage taps of said k+1 voltage taps of said first series circuit, said first switch being driven dependent upon said output signal of said counter configuration; and
a second switch selectively connecting one of said m voltage taps of said second series circuit to said output terminal and provide said analog filter output signal, said second switch being driven dependent upon said output signal of said counter configuration.

9. The filter configuration according to claim 8, wherein said resistors of at least one of said first series circuit and said second series circuit are different in each case.

10. The filter configuration according to claim 8, wherein said k resistors of said first series circuit are different from one another.

11. The filter configuration according to claim 8, wherein said m resistors of said second series circuit are different from one another.

12. A filter configuration for filtering an analog signal, comprising:
an analog-to-digital converter unit having:
an input for receiving an analog filter input signal having a magnitude; and
an output supplying a pulse signal having a sequence of pulses, a number of said pulses per unit time being dependent on the magnitude of the filter input signal;
a counter configuration connected to said output of said analog-to-digital converter unit and receiving said pulse signal from said analog-ta-digital converter unit, said counter configuration having at least one counter supplying a counter reading having a value; and
a digital-to-analog converter unit connected to receive said counter reading from said counter configuration in each case once during an evaluation interval and receiving a further signal, and forming an analog filter output signal having an amplitude dependent upon said value of said counter reading, and said digital-to-analog converter unit multiplying said further signal by said counter reading of said counter configuration.

13. The filter configuration according to claim 12, wherein said digital-to-analog converter unit has:
an output terminal providing said analog filter output signal;
a first series circuit having k resistors and k+1 voltage taps, a voltage dependent on said further signal being present across said first series circuit;
at least one second series circuit having:
first and second connection terminals;
m resistors: and
m voltage taps;
a first switch having a first and second contact pair connecting ,aid first and second connection terminals to two different voltage taps of said k+1 voltage taps of said first series circuit, said first switch being driven dependent upon said counter reading of said counter configuration; and
a second switch selectively connecting one of said m voltage taps of said second series circuit to said output terminal and provide said analog filter output signal, said second switch being driven dependent upon said counter reading of said counter configuration.

14. The fitter configuration according to claim 13, wherein said resistors of at least one of said first series circuit and said second series circuit are different in each case.

15. The filter configuration according to claim 13, wherein said k resistors of said first series circuit are different from one another.

16. The filter configuration according to claim 13, wherein said m resistors of said second series circuit are different from one another.

17. A filter configuration for filtering an analog signal, comprising:
an analog-to-digital converter unit having:
an input for receiving an analog filter input signal having a magnitude; and an output supplying a pulse signal having a sequence of pulses, a number of said pulses per unit time being dependent on the magnitude of the filter input signal;

a counter configuration connected to said output of said analog-to-digital converter unit and receiving said pulse signal from said analog-to-digital converter unit, said counter configuration having first and second counters supplying a counter reading with a value; and a digital-to-analog converter unit connected to said counter configuration, said counter configuration supplying said counter reading to said digital-to-analog converter unit in each case once during an evaluation interval and forming an analog filter output signal having an amplitude dependent upon said value of said counter reading;

said analog-to-digital converter unit having a first and second voltage-controlled oscillator each supplying an output signal or a first and second sigma-delta converter each supplying an output signal;

said output signal of said first voltage-controlled oscillator or said first sigma-delta converter being fed to said first counter;

an output signal of said second voltage-controlled oscillator or said second sigma-delta converter being fed to said second counter; and said first and second counters being coupled to set said second counter to a counter reading of said first counter.

18. In a power factor controller, a filter configuration for filtering an analog signal comprising:

an analog-to-digital converter unit having:
an input for receiving an analog filter input signal having a magnitude; and
an output supplying a pulse signal having a sequence of pulses, a number of said pulses per unit time being dependent on the magnitude of the filter input signal;

a counter configuration being connected to said output of said analog-to-digital converter unit and receiving said pulse signal from said analog-to-digital converter unit, said counter configuration having at least one counter supplying a counter reading having a value; and a digital-to-analog converter unit connected to said counter configuration, said counter configuration supplying said counter reading to said digital-to-analog converter unit in each case once during an evaluation interval and forming an analog filter output signal having an amplitude dependent upon said value of said counter reading.

19. A method for filtering an analog filter input signal, which comprises:

converting a filter input signal into at least one first pulse signal having a sequence of pulses, the filter input signal having an amplitude, a number of pulses per unit time being dependent on the amplitude of the filter input signal, changing a counter reading of at least one counter according to pulses of the at least one first pulse signal;

determining the counter reading of the at least one counter in predeterminable evaluation intervals; and generating an analog filter output signal that is dependent on the counter reading determined, the filter output signal having an amplitude dependent upon the counter reading.

20. The method according to claim 19, which further comprises exclusively effecting up-counting or down-counting with the at least one counter.

21. The method according to claim 19, which further comprises, upon reaching a minimum or maximum counter reading, the at least one counter starts to count at an initial value again.

22. The method according to claim 19, which further comprises:

starting to count with the at least one counter from an initial value; and upon reaching a minimum or maximum counter reading with the at least one counter, starting to count at the initial value again.

23. The method according to claim 19, which further comprises increasing the counter reading with each pulse of the pulse signal.

24. The method according to claim 19, which further comprises:

changing the counter reading of the at least one counter dependent upon pulses of a clock signal within a first time interval at a beginning of an evaluation interval and subsequently changing the counter reading dependent upon pulses of the pulse signal within a second and third time interval, storing the counter reading at the end of the second time interval; and setting the counter to the stored counter reading at the beginning of the next evaluation interval.

25. The method according to claim 24, which further comprises setting the third time interval to be longer than the second time interval.

26. The method according to claim 24, which further comprises increasing the counter reading by a fixed value within the first time interval.

27. The method according to claim 24, which further comprises:

defining a first lower value and a first upper value; and storing the first lower value or the first upper value at an end of the second time interval if the counter reading lies outside an interval defined by the first lower value and the first upper value.

28. The method according to claim which further comprises:

defining a lower limit value and an upper limit value; and outputting the counter reading of the at least one counter to form a control signal if the counter reading lies within an interval defined by the lower limit value and the upper limit value.

29. The method according to claim 19, which further comprises:

converting the analog filter input signal into a first pulse signal and a second pulse signal each having pulses;

providing the at least one counter as a first counter and a second counter;

changing a counter reading of the first counter dependent upon the pulses of the first pulse signal and changing a counter reading of the second counter dependent upon the pulses of the second pulse signal;

setting the second counter, at the beginning of an evaluation interval, to the counter reading of the first counter at an end of a previous evaluation interval; and forming the filter output signal utilizing the counter reading of the second counter at an end of an evaluation interval.

30. The method according to claim 29, which further comprises:

exclusively effecting up-counting or down-counting with the first counter; and upon reaching a maximum or minimum counter reading, starting to count at an initial value again.

31. The method according to claim 29, which further comprises:

starting to count with the first counter from an initial value;

exclusively effecting up-counting or down-counting with the first counter; and upon reaching a maximum or minimum counter reading with the first counter, starting to count at the initial value again.

32. The method according to claim 29, which further comprises setting frequencies of the first and second pulse signals to differ for the same filter input signal.

33. The method according to claim 29, which further comprises:

converting the analog filter input signal into the first pulse signal and a second pulse signal each having frequencies; and setting the frequencies of the first and second pulse signals to differ for the same filter input signal.

34. The method according to claim 19, which further comprises, during generation of the filter output signal, multiplying the counter reading by an instantaneous value of a further signal.

35. The method according to claim 34, which further comprises multiplying the further signal by a predeterminable factor prior to the multiplication, the factor being dependent upon an average value of the further signal.

36. The method according to claim 19, which further comprises setting the amplitude of the filter output signal to be exponentially dependent, on the counter reading at an end of an evaluation interval.

37. The method according to claim 19, which further comprises setting the amplitude of the filter output signal to not be linearly dependent upon the counter reading at an end of an evaluation interval.

38. A power factor controller, comprising:

input terminals for applying an input voltage;

output terminals for providing an output voltage;

an inductor having an energy uptake, said inductor connected to at least one of said input terminals;

at least one switch connected to said inductor and controlling said energy uptake of said inductor;

a drive circuit connected to said switch and driving said switch; and a feedback path connected to said output terminals and to said drive circuit and feeding a signal dependent upon said output voltage back to said drive circuit, said signal having a magnitude, said feedback path having a filter configuration with:

an analog-to-digital converter unit having:

an input for receiving said signal; and an output supplying a pulse signal having a sequence of pulses, a number of said pulses per unit time being dependent on said magnitude of said signal;

a counter configuration being connected to said output of said analog-to-digital converter unit and receiving said pulse signal from said analog-to-digital converter unit, said counter configuration having at least one counter supplying a counter reading having a value; and a digital-to-analog converter unit connected to said counter configuration, said counter configuration supplying to said digital-to-analog converter unit in each case once during an evaluation interval said counter reading and forming an analog filter output signal having an amplitude dependent upon said value of said counter reading, said digital-to-analog converter unit connected to said drive circuit and supplying said drive circuit with said analog filter output signal.

* * * * *